United States Patent [19]

Scharting et al.

[11] Patent Number: 4,976,551

[45] Date of Patent: Dec. 11, 1990

[54] TRANSPORTATION AND MOUNTING SLEEVE FOR ROW OF ROLLING ELEMENT

[75] Inventors: Günter Scharting, Gochsheim; Wolfgang Ortmann, Euerdorf, both of Fed. Rep. of Germany

[73] Assignee: FAG Kugelfischer Georg Schafer (KGaA), Fed. Rep. of Germany

[21] Appl. No.: 463,507

[22] Filed: Jan. 11, 1990

[30] Foreign Application Priority Data

Jan. 26, 1989 [DE] Fed. Rep. of Germany ... 8900848[U]

[51] Int. Cl.⁵ .................... F16C 43/04; F16C 19/22
[52] U.S. Cl. ................................. 384/448; 29/724; 384/569
[58] Field of Search ............. 384/445, 447, 448, 548, 384/559, 560, 569, 570, 584, 627; 29/724

[56] References Cited

U.S. PATENT DOCUMENTS

| | | | |
|---|---|---|---|
| 1,840,638 | 1/1932 | Schribner | 29/724 X |
| 2,069,569 | 2/1937 | Young | 384/570 X |
| 2,215,134 | 9/1940 | Rehnberg | 29/724 X |
| 2,312,615 | 3/1943 | Allen | 384/584 X |
| 3,168,774 | 2/1965 | Völkening | 29/724 X |
| 4,166,660 | 9/1979 | Murphy | 384/448 |
| 4,398,777 | 8/1983 | Murphy | 384/448 |

FOREIGN PATENT DOCUMENTS

| | | | |
|---|---|---|---|
| 2440717 | 3/1976 | Fed. Rep. of Germany | 384/584 |
| 921913 | 3/1963 | United Kingdom | 384/569 |

*Primary Examiner*—Thomas R. Hannon
*Attorney, Agent, or Firm*—Ostrolenk, Faber, Gerb & Soffen

[57] ABSTRACT

A transportation and mounting sleeve for a row of needles, rollers, or the like rolling elements, supported in an outer ring for installation in a bearing. The sleeve disposed inside the row of rolling elements is comprised of resilient plastic material and has a rounded polygonal shape, as seen in axial top view, and particularly a triangular shape, wherein the distance between at least two of the corners of the polygon is greater than the diameter of the envelope circle of the opening radially inside the rolling elements.

10 Claims, 1 Drawing Sheet

TRANSPORTATION AND MOUNTING SLEEVE FOR ROW OF ROLLING ELEMENT

BACKGROUND OF THE INVENTION

The present invention refers to a transportation and mounting sleeve for rolling elements, such as needles or rollers that are supported in an outer ring, as in a bearing. The sleeve has particular application for the supply of a complement of rolling elements, e.g., needles or rollers, for a bearing and for mounting those needles or rollers on the shaft or other element that defines the inner race of the bearing.

German Patent Application G 91 324 of 1936 shows a sleeve of this type in which a plurality of needles, which rest on their radial inside against the sleeve, are also supported on their radial outside within an outer ring. This prevents the needles from falling out of the outer ring upon transportation. Upon the mounting of this entire needle unit upon a shaft, the internal sleeve can be pushed off axially. The place of the sleeve is then taken by the shaft which produces a structural unit. In order to obtain a certain elasticity here, which permits the easy removal of the sleeve and impedes falling out, the sleeve has a slit. The sleeve therefore has a larger outside diameter in the unmounted condition than the inner envelope circle of the needles, and it rests under slight pressure against the needles. It is itself axially fixed. On the other hand, upon being pushed off, its diameter can change within the range of the width of the slit in the slit region so that a slight radial pressure is retained in all cases. That embodiment, however, has the disadvantage that no purely axially directed slit may be present in order to prevent the needles falling out or hanging through there, which would make mounting difficult. The thus required oblique orientations of the slit make the production of such sleeves very difficult. Either a complicated cutting step must be subsequently done or additional radially removable pusher tools must be provided in the region of the slit.

SUMMARY OF THE INVENTION

The object of the present invention is to improve a sleeve as described above to avoid the above disadvantage and to make it possible to obtain a sleeve that is simple to manufacture and which, on the one hand, is held in the bearing while, on the other hand, it can be relatively easily pushed out axially from the bearing.

The transportation and mounting sleeve of the invention is provided for needles for use in a needle bearing, for rollers for use in a roller bearing, or for the like rolling elements in a roller bearing. The needles, other rollers or other rolling elements (hereafter rolling elements) are arranged in an outer ring, which may become the outer ring of the bearing. To prevent the rolling elements from moving out of the outer ring, an annular sleeve is disposed radially inward of the outer ring and of the rolling elements, whereby the rolling elements are held in place in the outer ring by the sleeve.

Prior to mounting of the sleeve in the outer ring, the sleeve is not precisely circular making the sleeve unlike the outer ring. Instead, the sleeve has a rounded polygonal shape, as seen in axial top view, so that the sleeve has a plurality of outwardly projecting crests at the corners of the polygon and has radially more inward sides between those corners of the polygon. In a preferred embodiment, the sleeve may be approximately triangular in shape with rounded corners. It is possible, for example, that the sleeve might also be pentagonal with rounded corners.

It is preferable that the sleeve be comprised of a resilient material and specifically a plastic material. Further, the sleeve may be comprised of a transparent material so that the rolling elements outside the sleeve can be observed to see that they are proper in number, orientation and position.

Because the sleeve has a rounded polygonal shape, as seen in axial top view, it can be provided with a larger dimension, particularly between the corners or crests, than the inner envelope circle of the rolling elements without the occurrence of impermissible jamming. The elasticity results from the fact that upon application of pressure on the corrugation crests of the sleeve, the sleeve sections can move away into the corrugation valleys. As a result, the stability of a closed ring is retained, although, in a weakened form. This enables easy pushing off of the sleeve with, at the same time, sufficient pressure against the rolling elements. Since this sleeve does not have any sections which protrude forward or backward, it can be easily manufactured, for instance by the use of axially removable molded parts. The absence of interruptions in the sleeves furthermore prevents the sleeves from catching in their storage container before mounting and also facilitates the required uniform orientation of sleeves upon automatic mounting.

The form of this sleeve is preferably rounded triangular, as seen in axial top view. However, it may alternately be rounded pentagonal. As a result, the rolling elements can, on the one hand, be held securely while, on the other hand, the required elasticity of the sleeve is easily obtained.

To enable optical verification of the rolling elements, for instance with respect to their being present in full number and at correct orientation, it is advisable, in accordance with a further feature, to make the sleeve of transparent material.

Other features and advantages of the present invention will become apparent from the following description of the invention which refers to the accompanying drawings.

DETAILED DESCRIPTION OF THE PREFERRED EMBODIMENT

Figure 1:
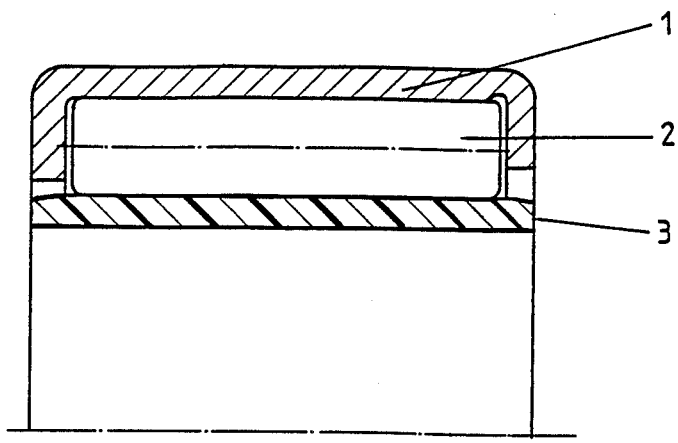
FIG. 1 is a partial cross-section of a needle bearing having a sleeve in accordance with the invention.

In accordance with FIG. 1, the illustrated needle bearing includes an outer ring having radially inwardly directed rims or lips, which are arranged on both axial sides of the ring and between which rims a series of axially extending needles 2 are arranged. To avoid the needles 2 falling out of the ring 1, a radially inward sleeve 3 of resilient plastic material is arranged in the radial region of the inner envelope circle of the needles before these bearing parts are pushed onto a shaft (not shown).

Figure 2:
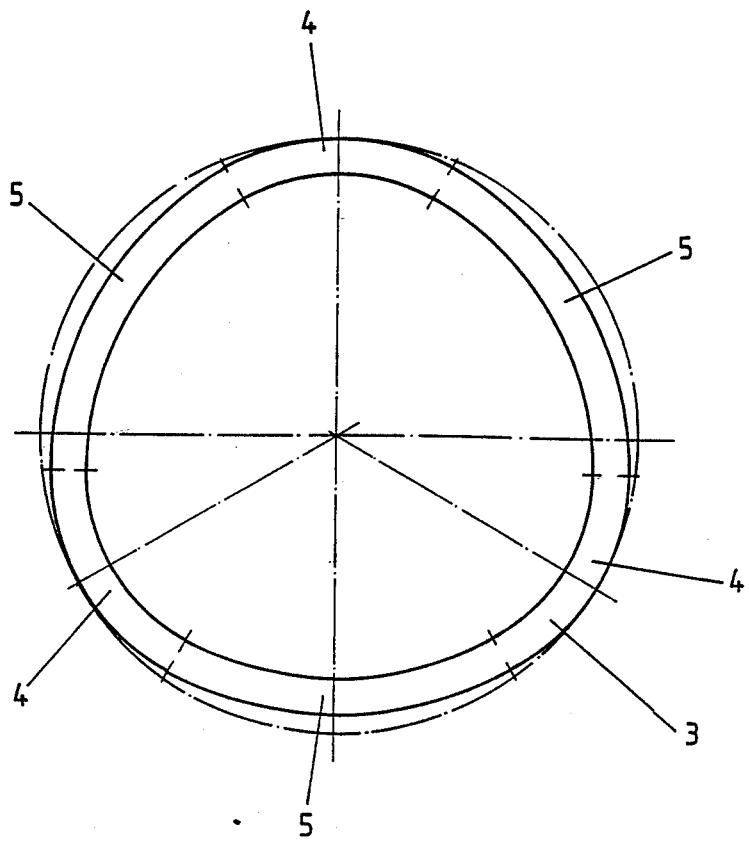
FIG. 2 is an axial side view of an entire sleeve of FIG. 1.

As shown in FIG. 2, the sleeve 3 has a rounded approximately polygonal, and particularly approximately triangular, shape, as seen in axial top view. The sleeve is an unbroken continuous sleeve. This polygonal shape has been shown in exaggerated fashion. The shape produces a certain elasticity of the sleeve since upon radially inward pressure upon the corrugation crests 4 or corners of the polygon, the sleeve can move out radially outward into the corrugation valleys 5. For this purpose, the distance between crests or corners is great enough that at least some, if not all, of the crests would project beyond the diameter of the inner envelope circle of the row of needles 2. In this way, with suitable dimensioning of the outer diameter of the sleeve 3 as referred to the inner envelope circle of the needles 2, the needles are held under slight pressure in the outer ring 1. Upon the pushing off of the sleeve 3 by the shaft, not shown, the fixing in position can, however, easily be overcome since the sleeve 3 can move into the valleys. As a result, the tension remains low.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A transportation and mounting sleeve for rolling elements for a bearing, wherein there is an outer ring for the rolling elements and the rolling elements are arrayed around and inside the outer ring, the sleeve being comprised of resilient material, being continuous and unbroken around the sleeve and having a rounded polygonal shape including corners of the polygon, as seen in axial top view, disposed radially on the inside of the row of rolling elements in the outer ring, the sleeve being sized with respect to the outer ring and the row of rolling elements so that for installation of the sleeve inside the row of rolling elements, the corners of the polygon are pressed radially inward to fit the sleeve within the inner envelope circle of the row of rolling elements.

2. The sleeve of claim 1, wherein between at least two of the corners of the sleeve, the dimension of the distance between the corners is greater than the diameter of the inner envelope circle of the row of rolling elements.

3. The sleeve of claim 1, wherein the sleeve is approximately triangular, as seen in axial top view.

4. The sleeve of claim 1, wherein the sleeve is comprised of a transparent material.

5. The sleeve of claim 4, wherein the sleeve is comprised of a plastic material.

6. The sleeve of claim 1, wherein the sleeve is comprised of a plastic material.

7. In combination, a transportation and mounting sleeve, an outer ring disposed radially outside the sleeve, and a row of rolling elements supported inside the ring, between the ring and the sleeve;

the sleeve being comprised of resilient material being continuous and unbroken around the sleeve and having a rounded polygonal shape including corners of the polygon, as seen in axial top view, disposed radially on the inside of the row of rolling elements in the outer ring, the sleeve being sized with respect to the outer ring and the row of rolling elements so that for installation of the sleeve inside the row of rolling elements, the corners of the polygon are pressed radially inward to fit the sleeve within the inner envelope circle of the row of rolling elements.

8. The combination of claim 7, wherein the ring has a respective shoulder at each axial end for defining an axial support for each end of the rolling elements.

9. The combination of claim 8, wherein the rolling elements are in the form of needle rollers.

10. The combination of claim 7, wherein the rolling elements are in the form of needle rollers.

* * * * *